C. J. HARTER.
COMBINED STATION INDICATOR AND ADVERTISING DEVICE.
APPLICATION FILED NOV. 2, 1914.
1,174,413.
Patented Mar. 7, 1916.
6 SHEETS—SHEET 1.
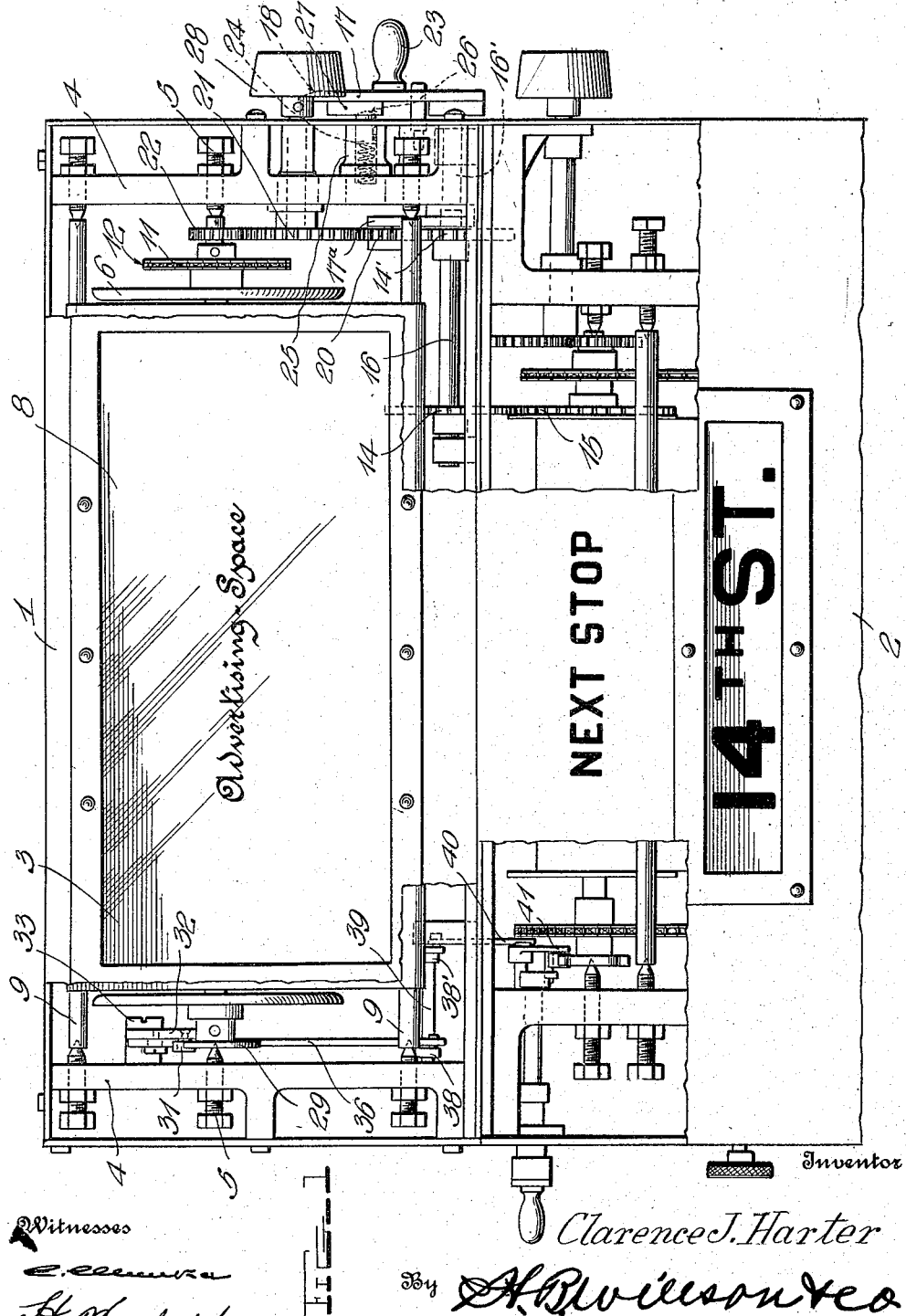
Witnesses
Inventor
Clarence J. Harter
By H. B. Willson & Co.
Attorneys

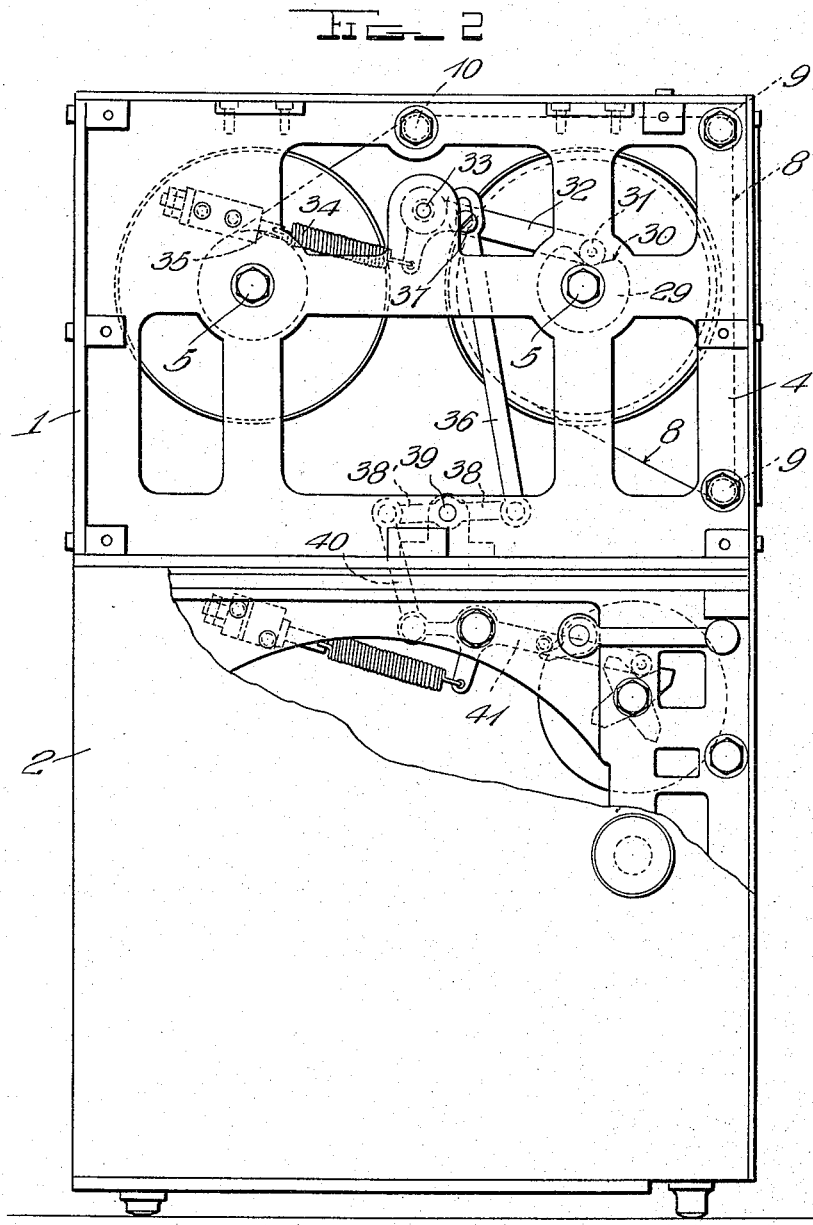

C. J. HARTER.
COMBINED STATION INDICATOR AND ADVERTISING DEVICE.
APPLICATION FILED NOV. 2, 1914.
1,174,413.
Patented Mar. 7, 1916.
6 SHEETS—SHEET 3.
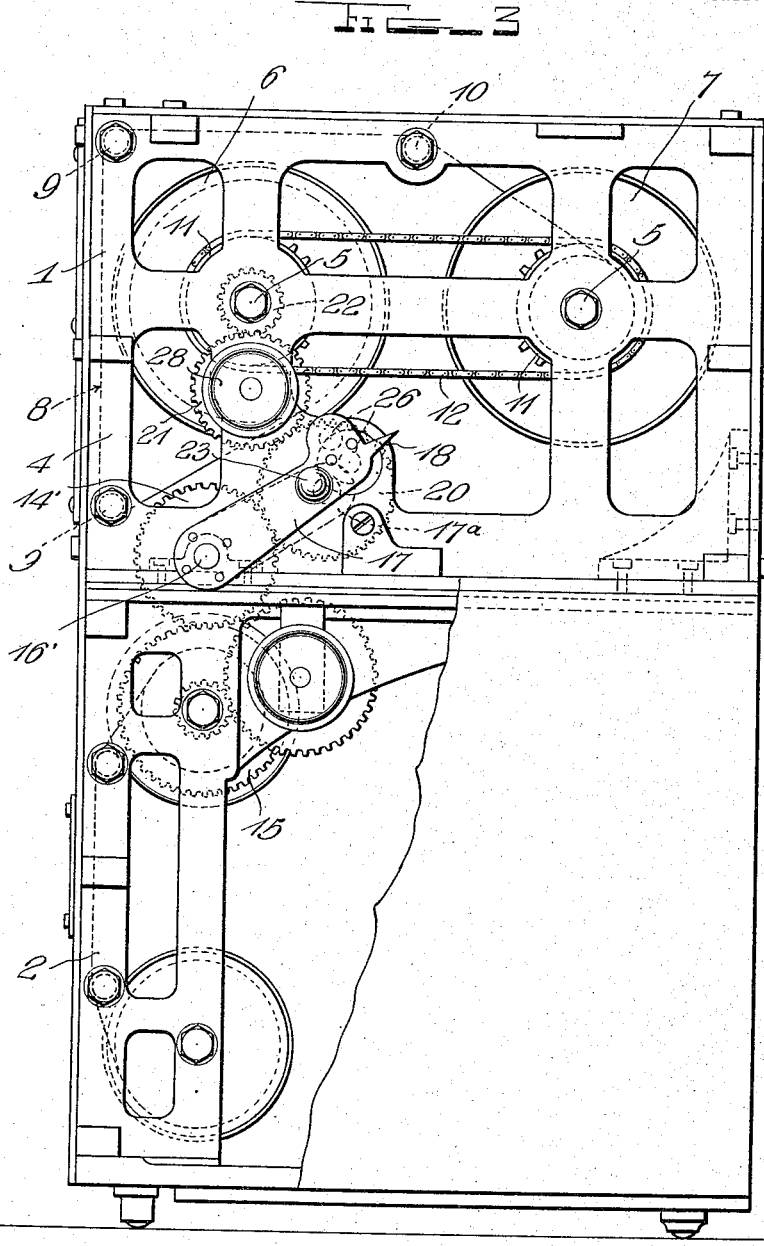

C. J. HARTER.
COMBINED STATION INDICATOR AND ADVERTISING DEVICE.
APPLICATION FILED NOV. 2, 1914.
1,174,413.
Patented Mar. 7, 1916.
6 SHEETS—SHEET 4.
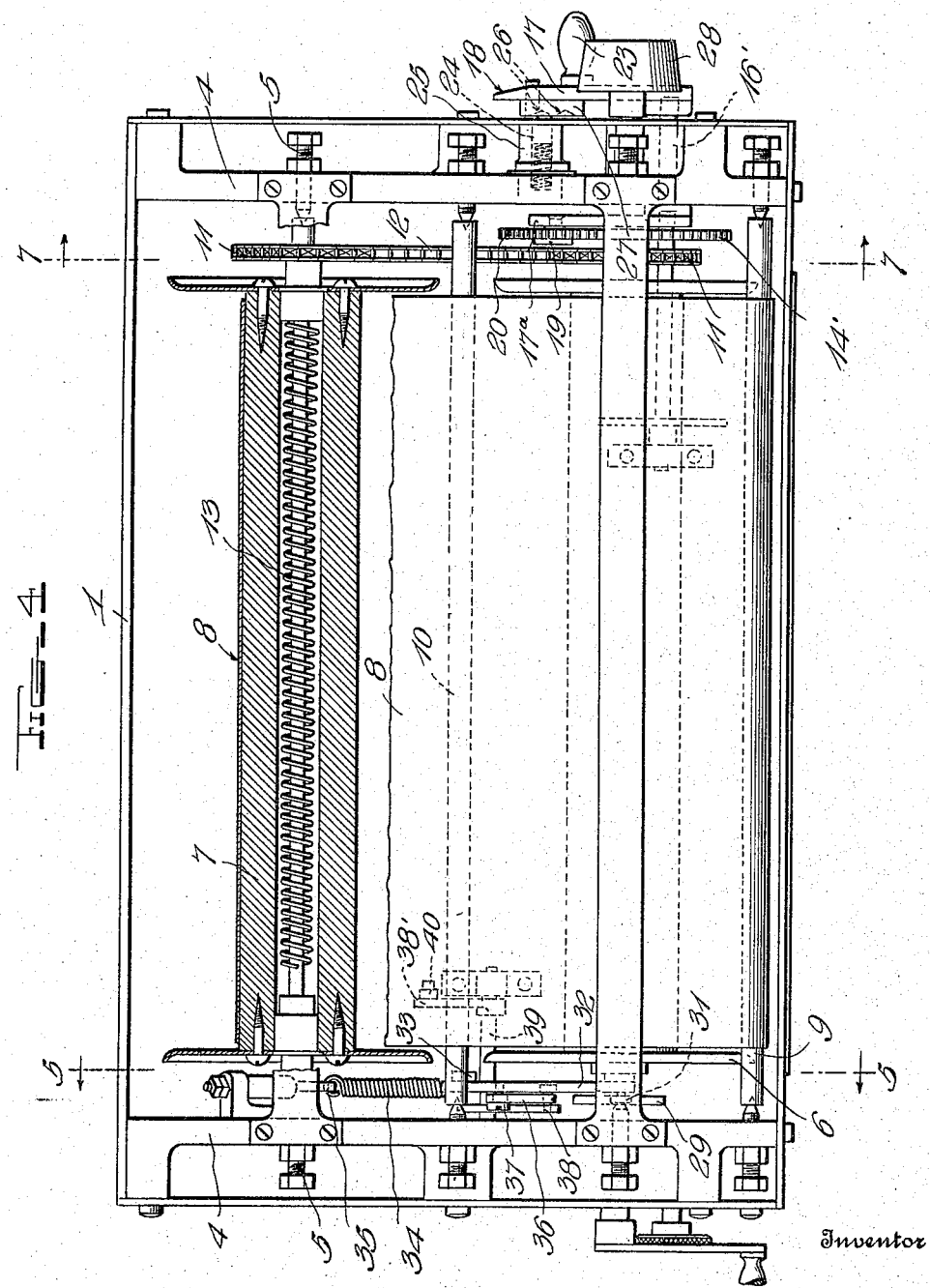

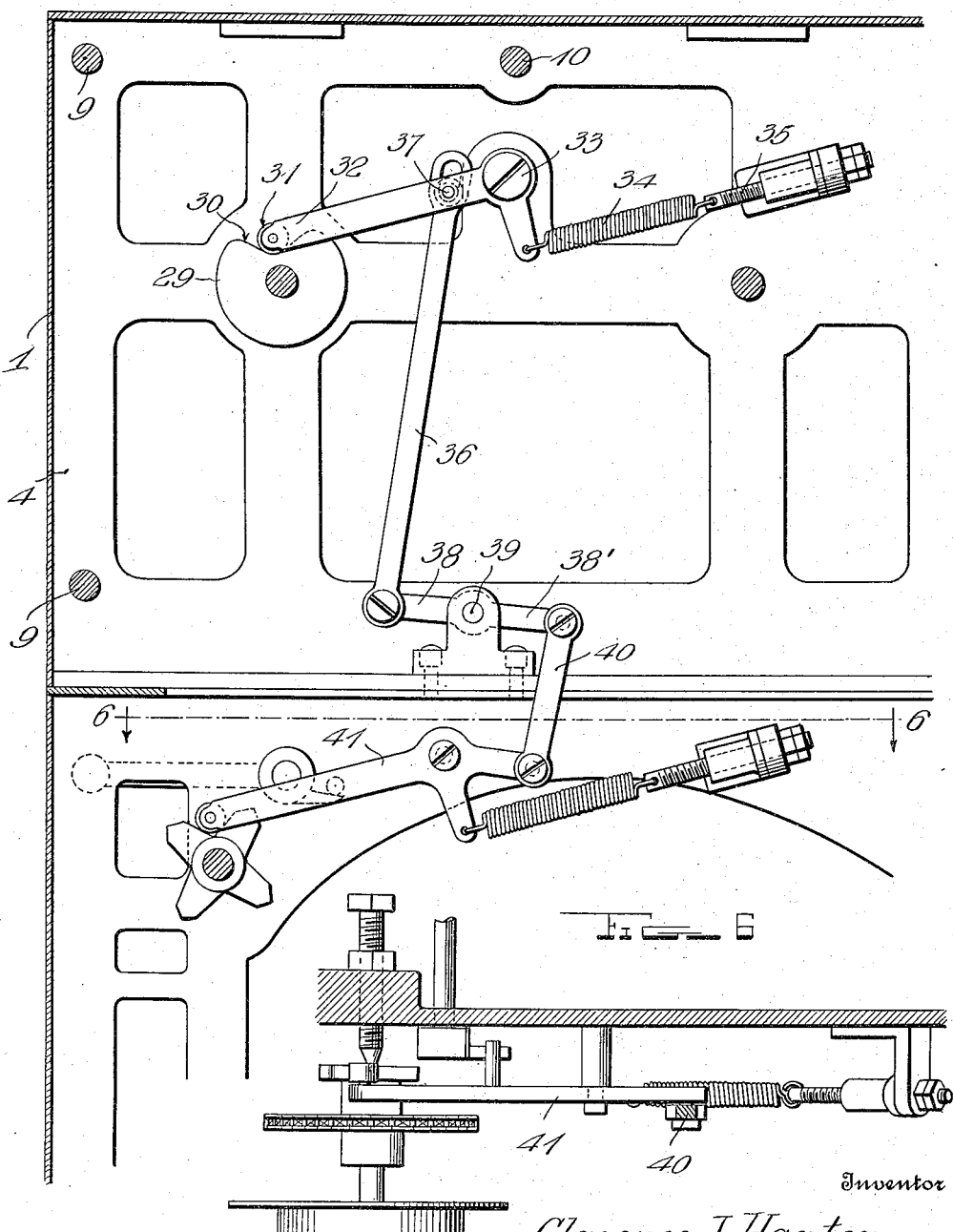

C. J. HARTER.
COMBINED STATION INDICATOR AND ADVERTISING DEVICE.
APPLICATION FILED NOV. 2, 1914.
1,174,413.
Patented Mar. 7, 1916.
6 SHEETS—SHEET 6.
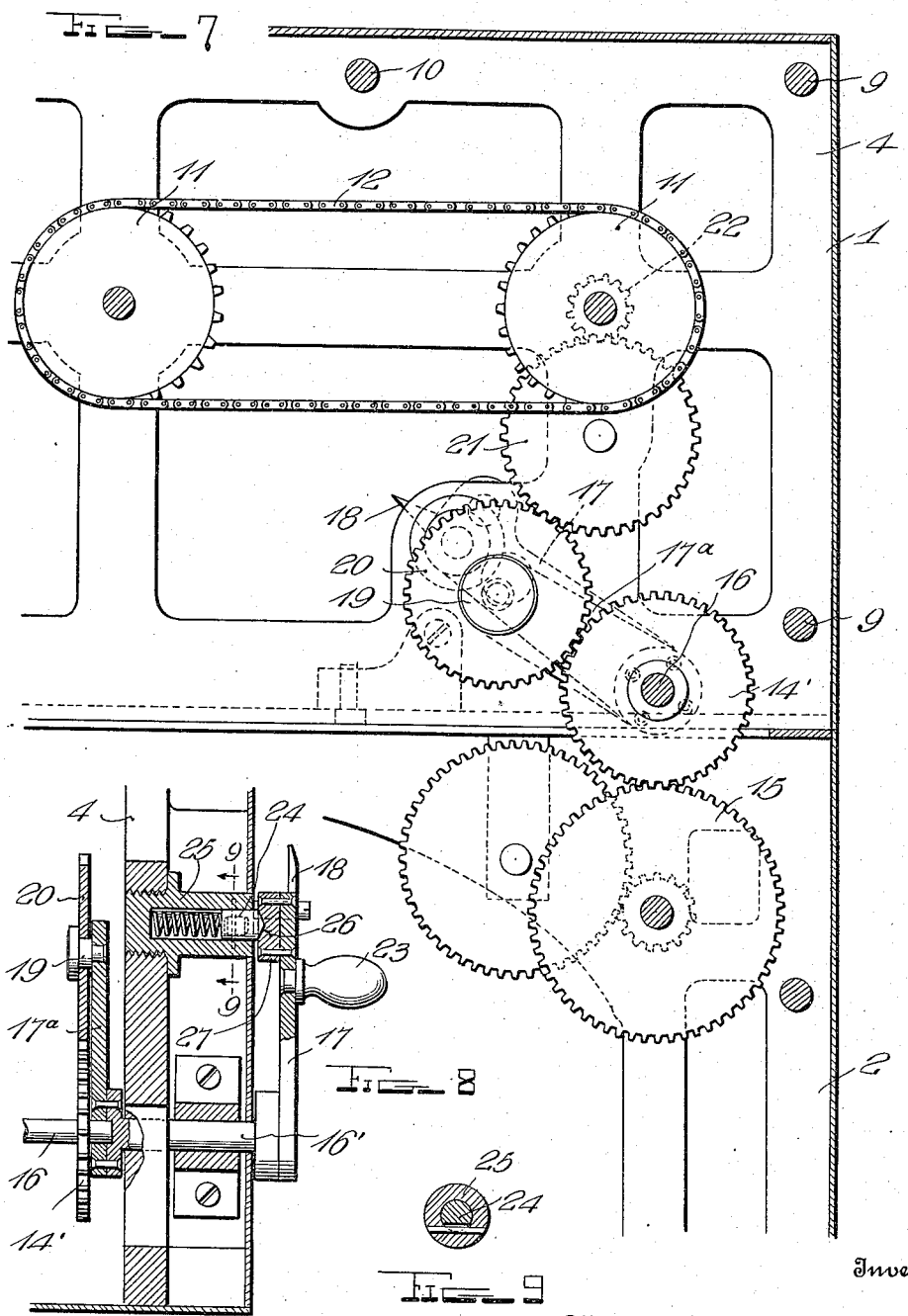
Witnesses
C. Clemmer
H. Woodard
Inventor
Clarence J. Harter
By H. B. Willson & Co.
Attorneys

UNITED STATES PATENT OFFICE.

CLARENCE J. HARTER, OF BRIDGEPORT, CONNECTICUT.

COMBINED STATION-INDICATOR AND ADVERTISING DEVICE.

1,174,413. Specification of Letters Patent. Patented Mar. 7, 1916.

Application filed November 2, 1914. Serial No. 869,884.

*To all whom it may concern:*

Be it known that I, CLARENCE J. HARTER, a citizen of the United States, residing at Bridgeport, in the county of Fairfield and State of Connecticut, have invented certain new and useful Improvements in Combined Station-Indicators and Advertising Devices; and I do declare the following to be a full, clear, and exact description of the invention, such as will enable others skilled in the art to which it appertains to make and use the same.

My invention relates broadly to improvements in indicating machines such as those including a station indicator and an advertising device, and specifically to gear meshing means designed for use in connection with a train of gears for driving one of the devices from the other.

In a machine of the class specified, the two indicators will be equipped with traveling ribbons moved intermittently, one displaying the name of the station and the other the name of one or more business concerns at or near such point. It often becomes expedient to discontinue the use of the advertising device and to allow the station indicator to continue to operate, this being accomplished by throwing a shiftable gear out of mesh; but when the two devices are to be again actuated simultaneously, the ribbon of one must assume a certain predetermined relation in respect to the ribbon of the other, and at the same time provision must be made whereby the shiftable gear may be again thrown into mesh without difficulty. The invention aims to accomplish these results in an efficient manner, by the provision of certain novel features of construction and combination hereinafter fully described and claimed and shown in the accompanying drawings wherein:—

Figure 1 is a front elevation of a device constructed in accordance with my invention and applied to use, parts thereof being broken away to disclose the internal operating structure thereof; Fig. 2 is a left hand or side elevation of the device with parts broken away to disclose clearly the spacing mechanism for the cylinders; Fig. 3 is an opposite side elevation of the device with parts broken away to show the connection between the advertising indicator and the station indicator; Fig. 4 is a horizontal section through the device; Fig. 5 is an enlarged vertical section of the device as seen on line 5—5 of Fig. 4 showing more clearly the spacing mechanism of the cylinders; Fig. 6 is a horizontal section as seen on line 6—6 of Fig. 5; Fig. 7 is a vertical section through the device as seen on line 7—7 of Fig. 4 and showing the gear train between the two indicating devices; Fig. 8 is a section through the device showing the spring latch member in connection with the gear shifting lever; Fig. 9 is a detail vertical section as seen on line 9—9 of Fig. 8.

In describing the invention I shall refer to the drawings in which similar reference characters designate corresponding parts through the several views and in which 1 indicates a casing or housing applied to the top of a station indicator 2 such as is disclosed in my former Patent No. 844,593, issued February 19, 1907, the front wall of said housing being provided with a transparent pane 3 to permit the showing made by the indicator to be readily observed.

I shall describe my improved arrangement of parts in connection with an indicating device which in effect is a car advertising device, and with my patented station indicator above mentioned.

Suitably mounted in each side of the casing or housing 1 is a frame-like wall 4 which supports various operating mechanisms used in connection with the device, as will be hereinafter and more particularly set forth. Adjustably mounted in these frame-like walls 4 are what are known as pivot bearings 5 between which are rotatably mounted the front and rear cylinders or rollers 6 and 7 respectively. Wound on the front roller 6 is a ribbon 8 which is formed of any desired textile material and has printed thereon at regular intervals the names of various business places and any other data desired. This ribbon is trained over the rollers 9 which are provided at the forward end of the casing or housing and disposed above and below the transparent pane 3, said ribbon being first drawn over the lower roller and continued upwardly over the upper roller. Continuing from the upper roller this ribbon is drawn rearwardly over an additional roller 10 disposed in the upper portion of the housing and is then directed downwardly and engaged with the rear roller 7. It will be appreciated from this construction that as the rollers are rotated, the ribbon will be unwound from the forward roller and wound upon the rear roller, at the same time displaying before the transparent front of the housing the various advertising data contained on said ribbon.

The shafts upon which the rollers or cylinders 6 and 7 are mounted are each provided adjacent one end thereof with a sprocket 11 and trained over these sprockets is an endless chain 12 so that said rollers or cylinders are caused to rotate simultaneously. In order that there may be no slack in the ribbon or reel as the device is operated it will be appreciated that when one cylinder contains considerably more of said ribbon than the other the latter must be rotated faster than the former. This is compensated for by the provision of a spring 13 on the shaft of the cylinder 7 which has one end thereof engaged with said shaft and the opposite end engaged with the hub portion of the cylinder proper, said structure being substantially the same as that covered by my former Patent No. 879,261, issued February 18, 1908.

As stated I prefer to use this device in connection with my patented station indicator, although the same may be used in connection with any other operating means if desired. In carrying out the invention according to my preferences, a gear 14 is mounted on a rotatable shaft 16 carried in the one frame wall 4 of the housing, said gear projecting through the bottom of said housing and meshing with another gear 15 carried in the upper portion of the housing 2 of the station indicator. This latter gear forms a portion of the operating structure in the station indicator and the operation of the latter causes the gear 14 to be rotated. Mounted for oscillation on a stub shaft 16′ which alines with the shaft 16 supporting the gear 14 is an arm 17 the free end of which is designed to form a pointer 18. Also carried on the shaft 16′ to oscillate with the arm 17 is another arm 17ª carrying a stub shaft 19 which rotatably supports a gear 20 meshing with a gear 14′ also carried on shaft 16. Rotatably mounted on the wall 4 above the gear 14 and below the cylinder 6 is an additional gear 21 which meshes with a pinion 22 carried on the shaft of said cylinder 6 and when the arm 17 is swung to one position the gear 20 will also mesh with the gear 21. In this position the train of gears is complete and the cylinders are adapted to be rotated upon the rotation of the gear 15 in the station indicator. This arm 17 has a handle or the like 23 provided thereon for manually actuating the same and when the arm is lowered the gear 20 is disposed out of engagement with the gear 21 so that the station indicator may be operated without affecting the advertising device. In order to retain the arm 17 in either of its adjusted positions, a spring latch member 24 is suitably mounted in the casting 25 which is supported in the adjacent wall 4 the same projecting through the side wall of the casing or housing 1. This spring latch is adapted for engagement with a pair of notches 26 formed on the inner face of a boss 27 which is formed on the arm 17 adjacent its outer end. This structure is clearly shown in Fig. 8 of the drawings. Thus when the arm is raised or lowered, as the case may be, the same will be yieldingly retained in its adjusted position and the words "in" and "out" are preferably written or otherwise inscribed on the outer face of the side wall of the housing 1 to coöperate with the pointer 18. These words denote the position to which the pointer must be disposed in order to place the gears in or out of mesh, as the case may be. When the arm 17 is disposed so as to throw the gear 20 out of engagement with the gear 21 the cylinders may nevertheless be rotated manually by means of a knob or finger piece 28 which is provided on the stub shaft of the gear 21.

Mounted on the shaft of the cylinder or roller 6 on the side opposite that having the gear train connection is a disk or the like 29 which is provided with a notch 30 in its periphery. Engaging the periphery of this disk and also adapted to fit in the notch 30 thereof is a roller 31 carried on the outer end of the longer arm of an L-shaped lever 32. This L-shaped lever is in effect a bell crank lever fulcrumed at the junction of its arms as shown at 33 to a projection on the adjacent supporting wall 4. The opposite or shorter arm of the lever 32 has connection with one end of a coil spring 34 and the opposite end of said coil spring is connected with an adjusting screw 35 which is suitably supported on the aforesaid wall 4 adjacent the rear roller. The roller 31 is adapted to enter the notch 30 of the disk 29 when the cylinder comes to a stop and in view of the connection between the two instruments, that is, the station indicator and the advertising device, a proper spacing mechanism must be provided. In carrying out this idea, I provide an arm 36 which is loosely connected with the longer arm of the lever at a point as indicated at 37. This arm 36 is pivotally connected at its lower end with a crank arm 38 which is carried adjacent one end of an oscillating shaft 39, the latter being mounted in bearings on the base of the advertising device. An additional arm 38′ is carried on the shaft 39 adjacent its opposite end projecting in a direction opposite that of the arm 38 and connected to this arm 38′ is a link 40 which projects through the base of said housing 1 and has pivotal connection with an L-shaped lever 41 in the station indicator. This L-shaped lever 41 operates in the same connection with the operating parts of the station indicator as the lever 32 operates in this particular device. The connection between the two instruments is therefore made complete by this mechanism.

This construction is essential, since by its use, if the station indicator has been in operation without the advertising device (by throwing the gear 20 out of mesh with the gear 21) and it is again desired to drive the two units simultaneously, after first manually adjusting the ribbon of the advertising device to display the proper legend, (by actuation of the knob 28) the winding reels of both ribbons will assume a certain predetermined relation. This is effected by the peripherally notched disk 29, the similar disk on the station indicator, and the stop levers 32 and 41 which coact with the disks to always dispose the intermittently driven gear 20 and the gear 21 to be driven in a predetermined relation after each operation of said gear 20, thus allowing these gears to be readily meshed at will without causing the ends of the teeth thereof to abut each other. Thus it will be evident that the existing coaction between the driving mechanism at one end of the machine and the stop mechanism at the other end thereof produces desired results not heretofore obtainable in so far as I am advised.

From the foregoing description, taken in connection with the accompanying drawings, the construction, manner of operation and numerous novel features of the invention will be readily understood without requiring a more extended explanation, and it will be understood that although certain specific details of construction have been shown for accomplishing the desired results in the most effective manner, I need not be restricted to such details otherwise than to the extent to which the appended claims limit me.

Having thus described my invention, what I claim is:

1. The combination with a pair of indicating devices each having a display ribbon and a reel upon which such ribbon is to be wound, one of said reels being intermittently rotated, and the two ribbons having thereon corresponding legends to be simultaneously displayed when the two devices are operated in synchronism, of a gear rotated intermittently by the intermittently driven reel, an additional gear to be rotated to drive the other reel when the two gears are meshed, one of said gears being shiftable, and stop means for retaining the two gears in a predetermined relation during the idle intervals of the intermittently driven gear, whereby the two gears may be readily meshed, substantially as and for the purpose set forth.

2. The combination with a pair of indicating devices each having a display ribbon and a reel upon which such ribbon is to be wound, one of said reels being intermittently rotated, and the two ribbons having thereon corresponding legends to be simultaneously displayed when the two devices are operated in synchronism, of a gear rotated intermittently by the intermittently driven reel, an additional gear to be rotated to drive the other reel when the two gears are meshed, one of said gears being shiftable, a pair of rotatable members rotatable one with each gear, said members having thereon stops, and spring pressed stop members coacting with such stops to retain the two gears in a predetermined relation during the idle intervals of the intermittently driven gear, whereby the two gears may be readily meshed, substantially as and for the purpose set forth.

3. The combination with a pair of indicating devices each having a display ribbon and a reel upon which such ribbon is to be wound, one of said reels being intermittently rotated, and the two ribbons having thereon corresponding legends to be simultaneously displayed when the two devices are operated in synchronism, of a gear rotated intermittently by the intermittently driven reel, an additional gear to be rotated to drive the other reel when the two gears are meshed, one of said gears being shiftable, a pair of rotatable members movable one with each gear, said members having stops thereon, movably mounted spring pressed stop members coacting with the aforesaid stops to retain the two gears in a predetermined relation during the idle intervals of the intermittently driven gear, and connecting means between the two movably mounted stop members, whereby retraction of one will retract the other, substantially as and for the purpose specified.

In testimony whereof I have hereunto set my hand in presence of two subscribing witnesses.

CLARENCE J. HARTER.

Witnesses:
GEORGE MAC. MACDONALD.
ELIZABETH C. CURTIS.

Copies of this patent may be obtained for five cents each, by addressing the "Commissioner of Patents, Washington, D. C."